(12) United States Patent
Guettinger et al.

(10) Patent No.: US 11,585,824 B2
(45) Date of Patent: Feb. 21, 2023

(54) VIBRATION COMPATIBLE WATCHDOG FOR SPEED SENSORS

(71) Applicant: Infineon Technologies AG, Neubiberg (DE)

(72) Inventors: Johannes Guettinger, Lind ob Velden (AT); Peter Alfred Friessnegger, Kading (AT); Simon Hainz, Villach (AT)

(73) Assignee: Infineon Technologies AG, Neubiberg (DE)

( * ) Notice: Subject to any disclaimer, the term of this patent is extended or adjusted under 35 U.S.C. 154(b) by 152 days.

(21) Appl. No.: 17/081,181

(22) Filed: Oct. 27, 2020

(65) Prior Publication Data

US 2022/0128587 A1 Apr. 28, 2022

(51) Int. Cl.
*G01P 3/44* (2006.01)
(52) U.S. Cl.
CPC ..................... *G01P 3/44* (2013.01)
(58) Field of Classification Search
CPC ............. G01P 3/44; G01P 3/487; Y02E 30/00
See application file for complete search history.

(56) References Cited

U.S. PATENT DOCUMENTS

| | | | | |
|---|---|---|---|---|
| 5,917,320 A | * | 6/1999 | Scheller | G01D 5/145 324/207.2 |
| 2009/0153137 A1 | * | 6/2009 | Bailey | G01H 1/003 324/207.25 |
| 2011/0032073 A1 | * | 2/2011 | Mullet | G07C 9/00182 340/5.7 |
| 2011/0298449 A1 | * | 12/2011 | Foletto | G01P 3/487 324/207.13 |

* cited by examiner

*Primary Examiner* — Son T Le
*Assistant Examiner* — Adam S Clarke
(74) *Attorney, Agent, or Firm* — Harrity & Harrity, LLP

(57) ABSTRACT

A sensor device includes at least one first sensor element that generates a first sensor signal based on sensing a varying magnetic field; at least one second sensor element that generates a second sensor signal based on sensing the varying magnetic field; a signal tracking circuit that generates a trigger signal having trigger pulses that are generated based on crossings of the first sensor signal with an adaptive threshold and extracts vibration relevant information using the first sensor signal and the second sensor signal; an output controller that generates an output signal having output pulses that are triggered by the trigger pulses during a non-vibration event and suppress the output pulses during an entire duration of a vibration event; and a vibration detection circuit that detects the vibration event based on the extracted vibration relevant information and indicates the vibration event to the output controller.

23 Claims, 7 Drawing Sheets

VIBRATION COMPATIBLE WATCHDOG FOR SPEED SENSORS

BACKGROUND

Magnetic speed sensors are used in speed sensing for many applications in many industries including in the automotive industry for wheel speed, engine speed, and transmission speed, and the like. In the field of speed sensing, a sinusoidal signal may be generated by a magnetic sensor in response to a rotation of a target object, such as a wheel, camshaft, crankshaft, or the like. The sinusoidal signal may be translated into pulses, which is further translated into a movement detection or a speed output.

One purpose of a transmission speed sensor or a wheel sensor is to assess the speed at which a target object spins (e.g., a gear or a wheel). Information from a speed sensor may generate a speed signal representative of the speed of a target object as well as a direction signal representative of the rotational direction of the movement of the target object. Thus, a speed sensor may generate a speed signal and a direction signal. Based on these signals additional output signals (e.g., pulsed output signals) are generated that provide sensor information to a microcontroller or to an Electronic Control Unit (ECU). Mechanical vibration at the speed sensor can impact the speed signal and/or the direction signal by causing a false or unwanted sinusoidal oscillation in the signal, which in turn causes incorrect information output at the output signals.

With the trend of downsizing and with ongoing development of autonomous driving, the requirements of vibration suppression and 0 Hz capability are today not only needed in transmission applications but also in anti-lock braking system (ABS) sensors. Zero hertz capability provides high sensor sensitivity used for smaller rotational movements that are used for start/stop detection and hill holder detection (i.e., hill slippage detection). The higher the sensor sensitivity, the greater the resolution for detecting smaller movements. On the other hand, using vibration suppression algorithms that are too aggressive (i.e., sensors using too high of a sensitivity) might result in a sensor deadlock which results in no output switching. Magnetic particles, sudden airgap jump, large temperature drift might result in such a deadlock situation of the speed sensor. However, the requirements for vibration suppression and 0 Hz capability in terms of sensor sensitivity are conflicting.

In addition, a conflict exists between the requirement to suppress vibrations and the ability to recover to normal operation after a large signal change due to a particle or a significant airgap change. In both situations, the amplitude dependent hysteresis for extrema, direction, and speed detection might be too big to be able to track a significantly reduced signal. While during a vibration the suppression of the output signal is needed, the loss of the output signal after a large airgap change results in a sensor deadlock. In order to avoid a deadlock, the sensor can be automatically reset after a timeout without events at the output signal. The drawback of this solution is a reduced vibration suppression and the loss of functionality for a signal frequency close to 0 Hz needed for start/stop detection and hill holder detection.

A compromise between the ability to suppress vibrations and the possibility for deadlocks has to be made. The need for a compromise has been a longstanding issue in speed sensing, especially in transmission applications, where vibrations and particles are present in the application.

Therefore, an improved speed sensor capable of suppressing vibrations, prevent deadlocks, and permit 0 Hz capability may be desirable.

SUMMARY

Embodiments are directed to a speed sensor capable of suppressing vibrations, preventing deadlocks, and/or enabling 0 Hz capability.

One or more embodiments is directed to a sensor device that includes: at least one first sensor element configured to generate a first sensor signal based on sensing a varying magnetic field; at least one second sensor element configured to generate a second sensor signal based on sensing the varying magnetic field; a signal tracking circuit configured to generate a trigger signal having trigger pulses that are generated based on first crossings of the first sensor signal with at least one of at least one adaptive threshold, wherein the signal tracking circuit further extracts vibration relevant information using the first sensor signal and the second sensor signal; an output controller configured to generate an output signal having output pulses that are triggered by the trigger pulses during a non-vibration event and further configured to suppress the output pulses during an entire duration of a vibration event; and a vibration detection circuit configured to receive the extracted vibration relevant information, detect the vibration event based on the received extracted vibration relevant information, and indicate the detected vibration event to the output controller.

One or more embodiments is directed to an output pulse suppression method implemented in a speed sensor. The method includes: generating a first sensor signal based on sensing a varying magnetic field by at least one first sensor element; generating a second sensor signal based on sensing the varying magnetic field by at least one second sensor element; generating, by a sensor circuit, a trigger signal having trigger pulses that are generated based on first crossings of the first sensor signal with at least one of at least one adaptive threshold; extracting, by the sensor circuit, vibration relevant information using the first sensor signal and the second sensor signal; generating, by the sensor circuit, an output signal having output pulses that are triggered by the trigger pulses during a non-vibration event; detecting, by the sensor circuit, the vibration event based on the extracted vibration relevant information; and suppressing, by the sensor circuit, the output pulses during an entire duration of a vibration event.

BRIEF DESCRIPTION OF THE DRAWINGS

Embodiments are described herein making reference to the appended drawings.

DETAILED DESCRIPTION

Figure 1A:
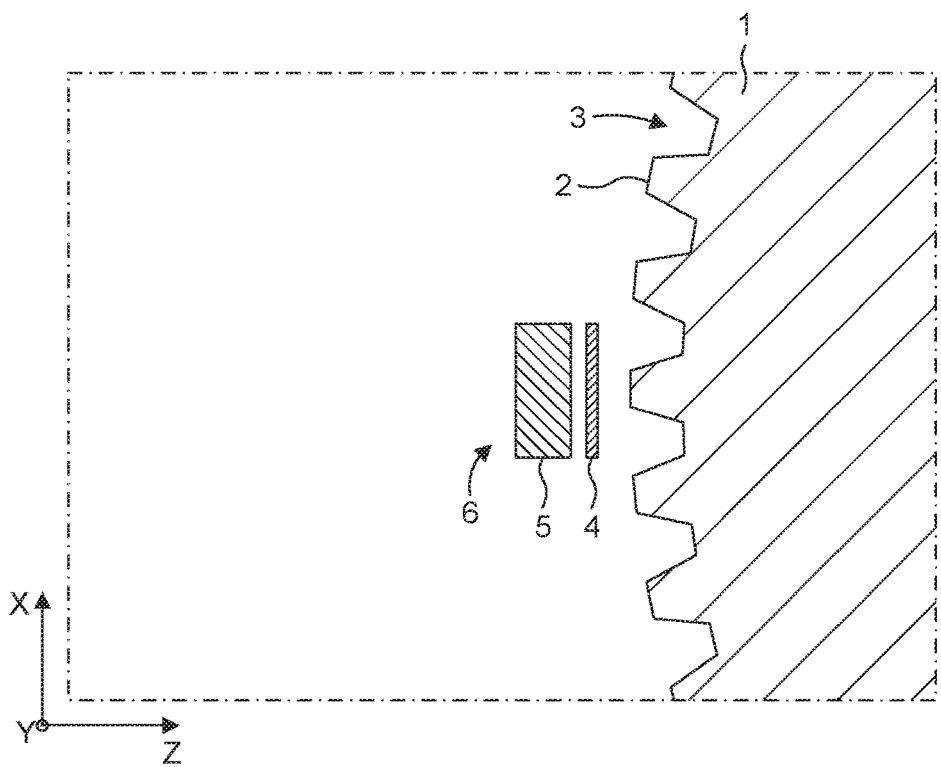
FIGS. 1A-1C illustrate a diagram of a magnetic field sensing principle using a first type of magnetic encoder according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

A sensor may refer to a component which converts a physical quantity to be measured to an electric signal, for example, a current signal or a voltage signal. The physical quantity may for example comprise a magnetic field, an electric field, a pressure, a force, a temperature, a current, or a voltage, but is not limited thereto. A sensor device, as described herein, may be a voltage sensor, a current sensor, a temperature sensor, a magnetic sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

Magnetic sensors include magnetoresistive sensors, inductive sensors, and Hall-effect sensors (Hall sensors), for example, and are mutually exchangeable in the embodiments provided herein. According to one or more embodiments, a plurality of magnetic field sensors and a sensor circuitry may be both accommodated (i.e., integrated) in the same chip. The sensor circuit may be referred to as a signal processing circuit and/or a signal conditioning circuit that receives one or more signals (i.e., sensor signals) from one or more magnetic field sensor elements in the form of raw measurement data and derives, from the sensor signal, a measurement signal that represents the magnetic field.

In some cases, a measurement signal may be differential measurement signal that is derived from sensor signals generated by two sensor elements having a same sensing axis (e.g., two sensor elements sensitive to the same magnetic field component) using differential calculus. A differential measurement signal provides robustness to homogenous external stray magnetic fields.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal, to be discussed below. Therefore, a chip, which may also be referred to as an integrated circuit (IC), may include a circuit that conditions and amplifies the small signal of one or more magnetic field sensor elements via signal processing and/or conditioning.

A sensor device, as used herein, may refer to a device which includes a sensor and sensor circuit as described above. A sensor device may be integrated on a single semiconductor die (e.g., silicon die or chip). Thus, the sensor and the sensor circuit are disposed on the same semiconductor die.

Magnetic field sensors provided herein may be configured for speed measurements and rotation direction measurements of a rotating magnetic encoder, such as a wheel or camshaft, referred to as a target object or target wheel.

One type of magnetic encoder may be a ferromagnetic encoder, which may be a toothed wheel or a toothed disc of ferromagnetic material with holes or notches that pass in front of the magnetic field sensor. The magnetic field may be produced by a back bias magnet coupled to a back of the magnetic field sensor. Thus, the strength of the magnetic field produced by the back bias magnet is altered by the passing of teeth and notches of the rotating magnetic encoder.

For example, the sensor module is positioned in proximity to the toothed wheel, where the distance between the sensor module and the toothed wheel is defined by an air gap. The airgap changes as a tooth or notch passes by the sensor module. Due to this changing airgap, the magnetic field (flux) produced by the back bias magnet expands or contracts in time with the approaching tooth or the receding notch. This fluctuation in the magnet field is measured by the sensor module, specifically by the one or more sensor elements of the sensor module.

A second type of magnetic encoder is an encoder that consists of alternating magnets, which are magnetized in opposite directions (e.g., alternating south-pole and north-pole magnets) and arranged along a circumference of the encoder. In this case the speed sensor is placed in front of the encoder and detects if the measured magnetic field changes its polarity. In this case, the speed sensor generates an output signal that indicates that a pole passed by.

Figure 1B:
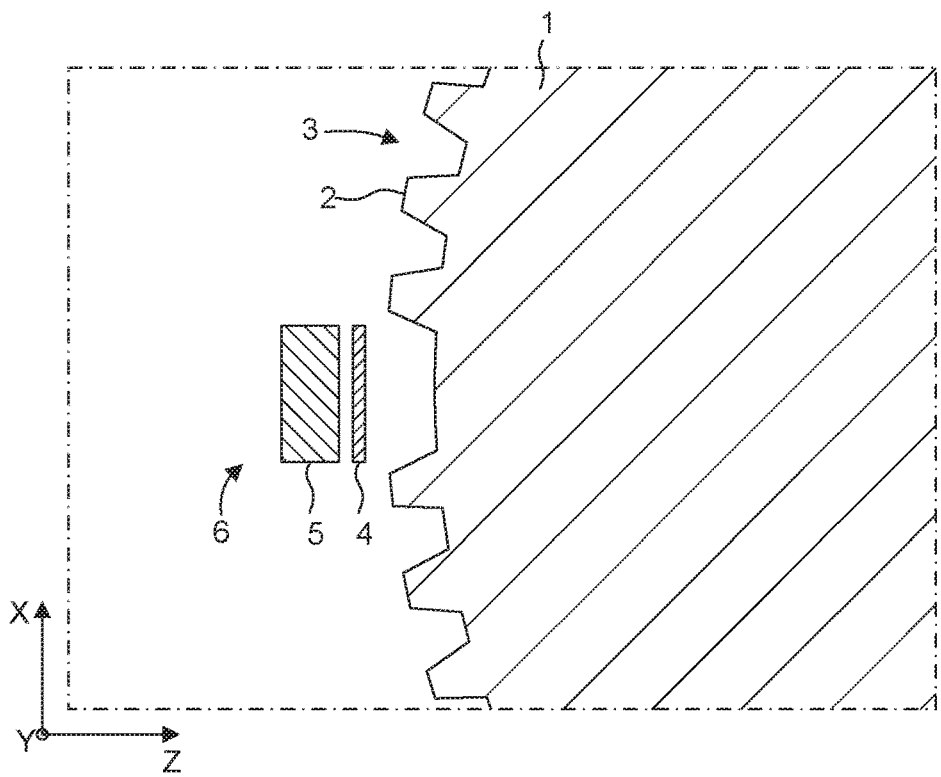
Figure 1C:
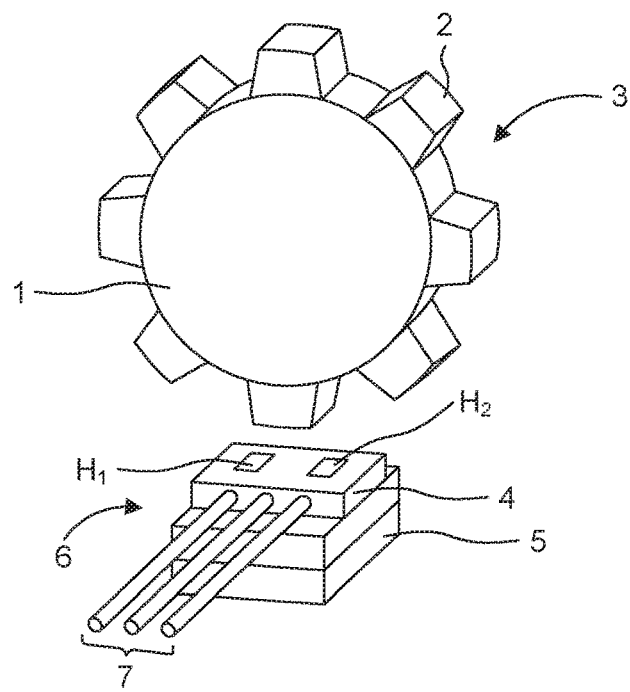

FIGS. 1A-1C illustrate a magnetic field sensing principle using a first type of magnetic encoder, a toothed wheel 1 that has alternating teeth 2 and notches 3, according to one or more embodiments. In particular, the toothed wheel 1 may be made of a ferromagnetic material (e.g., iron) that attracts magnetic fields. In addition, a sensor arrangement 4 is configured to sense a magnetic field produced by a back bias magnet 5, where the sensor arrangement 4 and the back bias magnet 5 comprise a sensor module 6. The sensor arrangement 4 may generally be referred to herein as sensor 4 and may further include a sensor circuit (not shown) and may be disposed in a sensor package.

FIGS. 1A and 1B show a tooth 2 and a notch 3 of wheel 1 passing the sensor module 6, respectively. In the instance of FIG. 1A, the magnetic field lines of the bias magnetic field produced by the back bias magnet 5 are pulled in the z-direction towards the tooth 2. Thus, the magnetic field lines are pulled away from the x and y-axes (i.e., the sensor planes of the sensor arrangement 4) and the sensed magnetic field strength in the x and y-directions is reduced such that a minimum field strength is detected at the center of the tooth 2. This may differ in real-world applications where the minimum may not occur exactly at the center due to assembly tolerances, but the minimum field strength should be detected substantially at the center of the tooth 2.

Conversely, in the instance of FIG. 1B, the magnetic field lines of the bias magnetic field produced by the back bias magnet 5 are not pulled (or are less pulled) in the z-direction towards the notch 3. Thus, the magnetic field lines remain more concentrated relative to the x and y-axes (i.e., the sensor planes of the sensor arrangement 4) and the sensed magnetic field strength in the x and y-directions are at a maximum at the center of the notch 3. This may differ in real-world applications where the maximum may not occur exactly at the center, but the maximum field strength should be detected substantially at the center of the notch 3.

FIG. 1C illustrates a schematic view of the sensor module 6 in proximity to the toothed wheel 1. The sensor module 6 includes sensor arrangement 4 having a sensor circuit (not shown) and two magnetic field sensor elements H1 and H2, and a back bias magnet 5 coupled to the sensor arrangement 4. The two magnetic field sensor elements H1 and H2 may be referred to herein as differential sensor elements and are linearly aligned in a rotation direction of the toothed wheel 1. The sensor signals of each differential sensor element H1 and H2 is provided to the sensor circuit that calculates a differential measurement signal using a differential calculation that may be used to cancel out homogeneous stray-fields in the sensor plane directions.

In addition, the differential sensor elements H1 and H2 may be disposed at a distance of about half of the pitch of the teeth of the toothed wheel 1 in order to generate a differential measurement signal with high signal to noise ratio. A pitch is the distance along a pitch circle between two adjacent teeth of a toothed wheel. Lastly, leads 7 provide an electrical pathway for various input and output signals (e.g., power, command, and output signals) to and from the sensor arrangement 4.

As the wheel 1 rotates, the teeth 2 and notches 3 alternate past the sensor module 6 and the sensor elements within the sensor arrangement 4 sense a change in the x-axis and y-axis magnetic field strength that varies as a sinusoidal waveform (i.e., as a signal modulation), the frequency of which corresponds to a speed of rotation of the wheel, and which further corresponds to a speed of rotation of a drive shaft (e.g., camshaft) that drives the rotation of the wheel.

Thus, the sensor circuit of the sensor arrangement 4 receives signals (i.e., sensor signals) from the magnetic field sensor elements H1 and H2 and derives, from the sensor signals, a differential measurement signal that represents the magnetic field as a signal modulation. The differential measurement signal may then be output as an output signal to an external controller, control unit, or processor (e.g., an ECU), or used internally by the sensor circuit for further processing (e.g., to generate a pulsed output signal) before being output to the external device. For example, the external device may count the pulses of the pulsed output signal and calculate a wheel-speed therefrom.

Figure 1D:
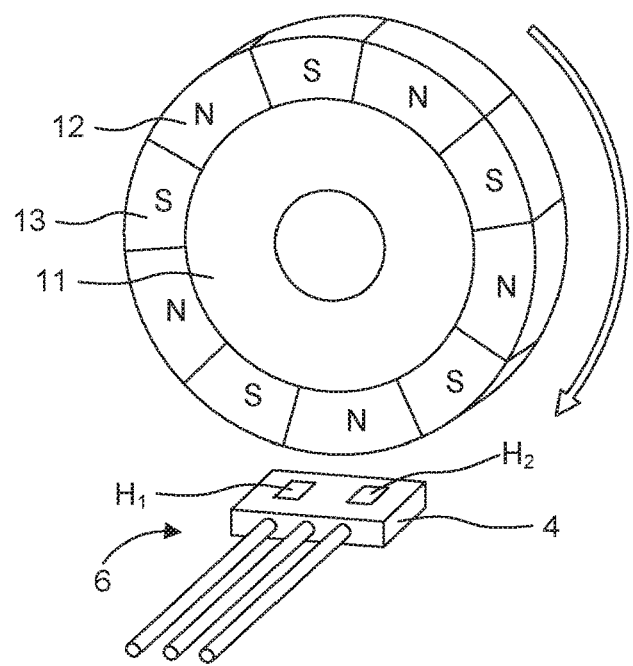
FIG. 1D illustrates a diagram of a magnetic field sensing principle using a second type of magnetic encoder according to one or more embodiments.

Alternatively, the two magnetic field sensor elements H1 and H2 may be laterally spaced apart in the sensing direction by a lateral distance as shown in FIGS. 1C and 1D, and one sensor element may be used to generate a speed sensor signal and the other sensor element may be used to generate the phase-shifted direction sensor signal. Thus, the two Hall sensor elements H1 and H2 may generate sensor signals Sx1 and Sx2, respectively, that are phase-shifted with respect to each other with the phase-shift being proportional to the lateral distance. This phase-shift can be used to sense a rotation direction of a rotating magnetic field, and, more specifically, a rotation direction of a target object by analyzing the direction of the phase shift.

FIG. 1D illustrates a magnetic field sensing principle using a second type of magnetic encoder, a magnetized encoder wheel, according to one or more embodiments. The sensor module 6 includes sensor arrangement 4 having a sensor circuit (not shown) and two differential magnetic field sensor elements, H1 and H2. The sensor signals of each differential sensor element H1 and H2 is provided to the sensor circuit that calculates a differential measurement signal using a differential calculation that may be used to cancel out homogeneous stray-fields in the sensor plane directions.

In addition, the differential sensor elements H1 and H2 may be disposed at a distance of about half of the pitch of the poles of the magnetized encoder wheel 11 in order to generate a differential measurement signal with high signal to noise ratio. A pitch is the distance along a pitch circle between two poles of the same polarity (i.e., between two adjacent positive poles or two adjacent negative poles) for a magnetized encoder wheel.

The magnetized encoder wheel 11 comprises alternating north pole sections 12 and south pole sections 13. Accordingly, the north pole sections 12 and south pole sections 13 represent teeth and notches of a tooth and notch wheel 1 described above. The sensor elements H1 and H2 of sensor arrangement 4, as described in reference to FIG. 1C, are sensitive to magnetic fields influenced by the north pole sections 12 and south pole sections 13 of the wheel 11. Here, since the magnetic field is actively generated by the wheel 11, a back bias magnet can be omitted. A sensor output corresponds to the rotational speed of the magnetized encoder wheel 11 by detecting the change of the alternating magnetic field in a similar manner described with respect to FIG. 1C. Thus, the sensor circuit of the sensor arrangement 4 generates a sensor output to be output by one of the leads 7.

In some cases, the sensor arrangement 4 may be a two-dimensional (2D) sensor that includes a first sensor element and a second sensor element. "2D" means that the sensor is configured to sense magnetic fields in two sensing directions. The two sensor elements may be xMR sensor elements, inductive sensor elements, Hall sensor elements, or any other magnetic sensor element that generates sensor signals in response to a magnetic field. In particular, the first sensor element may be an x-sensor that has a sensitivity axis (i.e., its sensitivity direction) aligned in an x-direction and generates sensor signals Sx in response to an x-component Bx of the magnetic field. In contrast, the second sensor element may be a y-sensor that has a sensitivity axis (i.e., its sensitivity direction) aligned in an y-direction and generates sensor signals Sy in response to a y-component By of the magnetic field. Thus, the sensitivity axes of the first sensor element and the second sensor element are orthogonal to each other. As a result, the sensor signals generated the sensor elements are shifted with respect to each other by 90°. Again, by monitoring the direction of the phase shift (e.g., positive or negative), the sensor circuit can determine a rotational direction of the magnetic field and thus of the target object.

For example, the sensor signal generated by the first sensor element may be sinusoidal and the sensor signal generated by the second sensor element may be cosinusoidal relative to the sensor signal generated by the first sensor element. Together, the sensor elements sense a change in the x-axis and y-axis magnetic field strength that varies as a sinusoidal waveform (i.e., as a signal modulation), the frequency of which corresponds to a speed of rotation of a rotating target object, such as a wheel or drive shaft.

In addition, it will be appreciated that the first sensor element and the second sensor element may each be comprised of one or more sensing elements. For example, in the event that the first sensor element and the second sensor element include two or more sensing elements, the sensing elements of each respective sensor element may be arranged in a differential configuration and/or a bridge configuration.

In view of the above, embodiments provide a magnetic sensor that maintains high vibration suppression while preventing a sensor deadlock. To achieve this, a signal event or time watchdog event is monitored and detected, and pulse delivery of the sensor output signal is suppressed in response to the event detection until the magnetic sensor determined whether or not a vibration is present (i.e., whether the detected event is caused by vibration). Thereby, pulse suppression during vibration is provided and at the same time deadlocks after airgap jumps can be avoided.

Figures 2, 3:
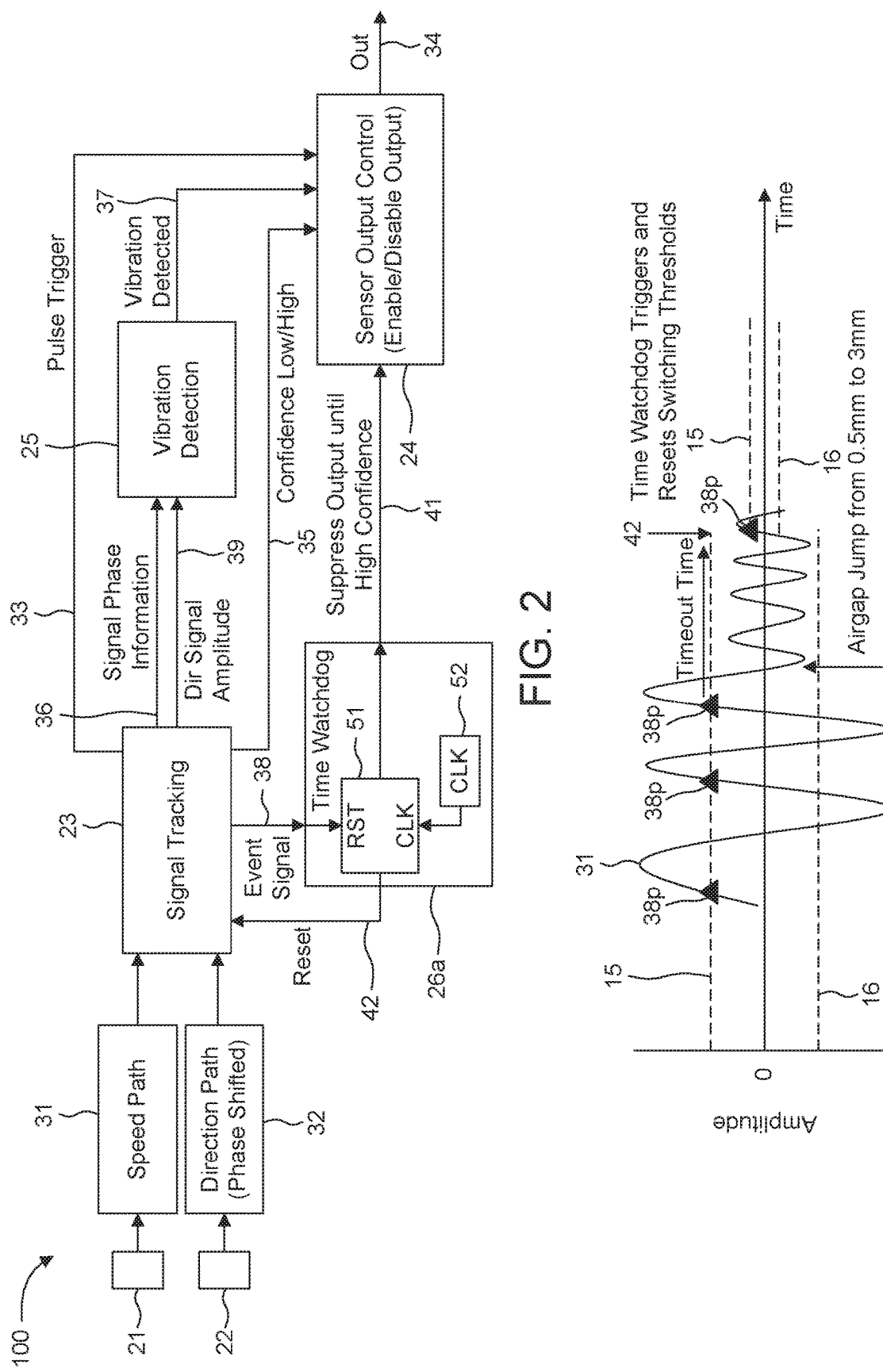
FIG. 2 is a schematic block diagram of a magnetic sensor according to one or more embodiments.
FIG. 3 illustrates an example of a sensor signal generated by a sensor element along with one set of hysteresis thresholds according to one or more embodiments.

FIG. 2 is a schematic block diagram of a magnetic sensor 100 according to one or more embodiments. The magnetic sensor 100 includes at least two magnetic sensor elements 21 and 22 that generate analog sensor signals 31 and 32, respectively. Sensor signal 31 may be a speed sensor signal transmitted along a speed signal path to the sensor circuit of the magnetic sensor 100 which comprises the remaining components of the sensor 100. Sensor signal 32 may be a direction sensor signal transmitted along a direction signal path to the sensor circuit. The sensor signal 32 is phase-shifted with respect to sensor signal 31 in accordance with the above-described sensor arrangements. For example, the sensor signal 31 generated by the sensor element 21 may be sinusoidal and the sensor signal 32 generated by the sensor element 22 may be cosinusoidal relative to the sensor signal 31 generated by the sensor element 21. Thus, sensor signal 31 may correspond to signal Sx and sensor signal 32 may correspond to signal Sy noted above, or sensor signal 31 may correspond to signal Sx1 and sensor signal 32 may correspond to signal Sx2 noted above.

The sensor circuit includes a signal tracking processing circuit 23 that analyses the speed and direction sensor data from the sensor signals 31 and 32 in order to extract amplitude information, offset information, and phase information from each of the sensor signals 31 and 32. In particular, the signal tracking processing circuit 23 may include a comparator that sends a pulse trigger as a trigger signal 33 if a threshold has been crossed by the amplitude of the input signal. For example, the signal tracking processing circuit 23 may compare the amplitude of the sensor signal 31 to one or more switching thresholds and generate trigger pulses based on the amplitude crossing the one or more switching thresholds. It will be appreciated that while the speed sensor signal 31 is described in the following embodiments for triggering certain events or pulses, the direction sensor signal 32 could be used additionally or in lieu thereof.

A sensor output control circuit 24 or protocol generator is configured to receive the trigger signal 33 from the signal tracking processing circuit 23 and generate output pulses based thereon as a sensor output signal 34 which might be a modulated current. The programmed switching protocol or rule set dictates the length and timing of the output pulses. In addition to the triggered output pulses, the protocol generator is also issuing safety related output signals. E.g. alive pulses, warning pulses, start and highspeed pulses or error states.

The output current (i.e., the sensor output signal 34) may be switched between two current values by the sensor output control circuit 24 in order to generate current pulses. The frequency of the current pulses is directly related to the rotational speed of the target object. Thus, the sensor output signal 34 may be a pulsed (digital) signal that is converted from the speed sensor signal 31 by the signal tracking processing circuit 23 and the sensor output control circuit 24 (protocol generator and current modulator).

The sensor output control circuit 24 is configured to receive the trigger signal 33 from the signal tracking processing circuit 23 and enable or disable the output pulses of the sensor output signal 34 based on vibration detection and other monitored parameters. In particular, the sensor output control circuit 24 may send an output pulse based on the trigger signal 33 as received from the signal tracking processing circuit 23 or ignore the trigger signal 33 and suppress the output pulse that would correspond to the trigger pulse depending on additional input signals 35, 37 and 41. The suppression of output pulses is needed to avoid sending wrong output pulses during a vibration event, where output pulses would otherwise be generated that do not correspond to the rotational speed. In normal operation, this behavior of suppressing the output pulses is triggered by the vibration detection circuit 25 depending on the phase shift between input signals 31 and 32 and based on the amplitude of the input signals 31 and 32. In this regard, any trigger pulses received via trigger signal 33 are disregarded and thus suppressed by the sensor output control circuit 24. This pulse suppression may also be referred to as pulse blanking, as no output pulses are output via the output signal 34 while the output pulses are disabled.

The signal tracking processing circuit 23 further determines phase information from the sensor signals 31 and 32, including whether the phase shift between the two signals is positive or negative and indicating whether there has been a direction change in the phase shift that indicates a rotational direction change of the target object (e.g., a change from clockwise to counter-clockwise or vice versa). The signal tracking processing circuit 23 generates a phase signal 36 that provides the phase information (e.g., direction change signaling) to a vibration detection circuit 25. The signal tracking processing circuit 23 also provides the amplitude of the direction signal 32 in a direction amplitude signal 39.

Direction changes are more prevalent in the event that vibration is present, which can cause frequent changes in phase shifts between the sensor signals 31 and 32. As vibration occurs, the phase shifts between the sensor signals 31 and 32 can oscillate between negative and positive, be zero/180°, or leave a visible signal only in one of the two speed/direction signal channels. The vibration detection circuit 25 monitors all of these behaviors for detecting vibration. Additionally, if the direction amplitude signal 39 is too small (e.g., below a predetermined threshold value), vibration is detected and signaled to the sensor output control circuit 24 via vibration detection signal 37.

The phase information (e.g., direction change) and direction amplitude is processed by the vibration detection circuit 25, which outputs the detection of a vibration via a vibration detection signal 37. Vibration is detected by analyzing the history of the detected rotation directions with different criteria programmable by EEPROM (e.g., a rotation direction pattern of forward, forward, backward may indicate vibration and/or an alternating rotation direction pattern of forward, backward, forward, backward may indicate vibration). Furthermore, if the direction amplitude signal 39 is too small (e.g., below a predetermined threshold value), vibration is detected.

The vibration detection circuit 25 transmits the vibration detection signal 37 to the sensor output control circuit 24 signaling a detected vibration event. In response to being notified of the detected vibration event, the sensor output control circuit 24 disables the output pulses of the output signal 34.

Additional functionality of the sensor circuit is described in conjunction with FIG. 3. FIG. 3 illustrates an example of a sensor signal generated by a sensor element along with one set of hysteresis thresholds according to one or more embodiments. The signal tracking processing circuit 23 implements the programmed current switching protocol based on adaptive hysteresis thresholds 15 and 16. In particular, the sensor signal may be the speed sensor signal 31. One set of hysteresis thresholds includes a first switching threshold 15 and a second switching threshold 16. The signal tracking processing circuit 23 is configured to compare the sensor signal 31 to one or both of the switching thresholds 15, 16 to generate trigger pulses transmitted as the pulse trigger signal 33. A switching threshold is a switching point at which the signal tracking processing circuit 23 switches the output signal from one state to another state (i.e., low-to-high or high-to-low) to generate a pulse when it detects the sensor signal 31 crossing of the switching point.

An output signal may be pulsed when the speed sensor signal 31 crosses a switching threshold 15 or 16 from one direction (e.g., on a rising edge of the sensor signal). However, the signal tracking processing circuit 23 may be configured such that the output signal is pulsed when the speed sensor signal 31 crosses a switching threshold from either direction (e.g., on a rising or a falling edge). Alternatively, the output may be switched from logic low to high on a first rising edge of the speed sensor signal 31 and from logic high to low on a first falling edge of the speed sensor signal 31, or vice versa, where the rising and the falling edges occur at a same switching threshold crossing. Thus, pulses in the output signal 34 may be triggered in multiple ways.

The first switching threshold 15 and the second switching threshold 16 can be adjusted (i.e., adapted) based on the history of the sensor signal 31. For example, the switching thresholds 15 and 16, stored in memory, are located between the minimum (min) and the maximum (max) of the magnetic field B. The signal tracking processing circuit 23 may use an update algorithm stored in a processor to regularly and autonomously (re)calculate the switching thresholds 15 and 16 (i.e., an offset thereof), and self-calibrate the switching points implemented by the signal tracking processing circuit 23. As will be discussed, the switching thresholds 15 and 16 may be initialized or reset to respective minimum values and adjusted based on an update threshold algorithm implemented by the signal tracking processing circuit 23.

In order to make the correct pulse delivery more robust against noise and small vibrations, the hysteresis level of the switching thresholds 15 and 16 are adaptively set depending on the amplitude of the speed signal 31. By adapting one or more switching points on a continual basis, the accuracy of the switching point is maintained in a desired region in accordance with fast changes of the sensor signal and assures that no additional pulses are sent and a good jitter performance is achieved.

The calibration of the hysteresis level may be based on an average of one or more minima and one or more maxima of the measured magnetic field based on the sensor signal 31. For example, the switching thresholds 15 and 16 may be calculated as based on an average of the most recent minimum and maximum values of the speed sensor signal 31, and adjusted accordingly. For example, the switching thresholds 15 and 16 may be set to a predefined percentage (e.g., 90%) of the peak-to-peak average of the sensor signal 31. The most recent minimum and maximum values may be used from the most recent period of the speed sensor signal 31. In particular, the signal tracking processing circuit 23 may be configured to perform an update after the first signal period and once per signal period thereafter. Once a complete signal period has occurred, the signal tracking processing circuit 23 may use the speed sensor signal 31 over the course of that signal period in the manner described above to perform an update to the switching thresholds 15 and 16.

Sudden airgap jumps may be caused, for example, by mechanical shock. The bigger the airgap between the magnetic sensor 100 and the target object, the smaller the sensor signals 31 and 32. Thus, when a large airgap jump occurs, sensor signal 31 may no longer meet or cross the switching thresholds 15 and 16 and its extrema (maximum and minimum) are instead confined within the region there between. When this occurs, switching (i.e., pulse generation) at output signal 34 should not occur until it is confirmed that the vibration is no longer present.

For example, a vibration can cause the speed sensor signal to jump in amplitude, becoming much larger at the beginning of the vibration. This results in the switching thresholds 15 and 16 being increased exceptionally high by the calibration. However, when the vibration stops, the sensor 100 may no longer react to the smaller signal due the increased values of the switching thresholds 15 and 16. In other words, the vibration may cause the switching thresholds 15 and 16 to be set outside the bounds of the speed sensor signal 31 when vibration is not present, resulting in a sensor deadlock. Alternatively, there can be a displacement of the wheel with respect to the sensor if a gear is put in. Or there may be metal particles between the wheel and the sensor that increases or reduces the speed sensor signal 31. In any of these instances, the extrema of the speed sensor signal 31 may fall below the hysteresis level defined by the switching thresholds 15 and 16 and the sensor circuit may no longer be able to detect threshold crossings of 15 and 16.

To prevent sensor deadlock, two options are presented. Either a time watchdog circuit 26a that implements a timeout is used or a signal watchdog circuit 26b that implements a second set of hysteresis thresholds 17 and 18 is used (see e.g., FIG. 5). Both options will be addressed in turn starting with the time watchdog circuit 26a shown in FIG. 2, followed by the signal watchdog circuit 26b shown in FIG. 4.

Turning back to FIG. 2, the signal tracking processing circuit 23 implements an event generation protocol based on adaptive hysteresis thresholds 15 and 16 using sensor signal 31 to generate signal events 38 (e.g., event pulses). If the sensor signal 31 is tracked correctly, in every signal period, at least one event is signaled via event signal 38 by the signal tracking processing circuit 23 to the time watchdog circuit 26a that operates as a time watchdog.

For example, the signal tracking processing circuit 23 may generate the event signal 38 (e.g., an event pulse 38) each time sensor signal 31 crosses one or both of the switching thresholds 15 and/or 16 in a particular rising or falling direction. In this case, event pulses are triggered each time sensor signal 31 crosses switching threshold 15 on a rising edge. Alternatively, the signal tracking processing circuit 23 may detected an instance when the sensor signal 31 is at a maximum or minimum peak amplitude and generate event pulses 38 at each maximum or minimum peak amplitude. Event trigger points 38p are indicated in FIG. 3 and may be set according to any type of rule set. The event signal 38 is sent to the time watchdog circuit 26a for monitoring.

The time watchdog circuit 26a has a counter 51 that counts up based on a clock signal generated by a clock (CLK) signal generator 52. The clock signal is received at the CLK input of counter 51 and the counter 51 counts clock pulses until an event signal 38 is received that indicates a crossing event of one of the switching thresholds 15 and/or 16. In particular, the event signal 38 is provided to a reset (RST) input and event pulses from the event signal 38 trigger a reset of the counter 51 to zero. On the other hand, if the counter 51 reaches a predefined timeout threshold (e.g., 500 ms) due to the absence of such an event pulse from event signal 38, the counter 51 triggers one or more set signals. In particular, the counter 51 generates a suppression signal 41 and a reset signal 42 corresponding to the set signal in response to the counter value of the counter 51 meeting or exceeding the predefined timeout threshold that corresponds to a preset timeout time.

The suppression signal 41 instructs the sensor output control circuit 24 to suppress output pulses of the output signal 34 until the confidence signal 35 indicates a high level of confidence after a recalibration phase (i.e., until confidence signal 35 is set to a value corresponding to high confidence).

The reset signal 42 resets the thresholds 15 and 16 at the signal tracking processing circuit 23 to predefined minimum values (e.g., threshold 15 is set to a first minimum value and threshold 16 is set to a second minimum value) so that threshold calibration of the thresholds 15 and 16 starts anew. The reset signal 42 also resets the confidence signal 35 to a low confidence value (i.e., a value corresponding to low confidence).

The signal tracking processing circuit 23 determines a confidence level of the extracted information taken from the analyses of the speed and direction sensor data and generates a confidence signal 35 that indicates a level of confidence (e.g., low or high) of the extracted information. The confidence signal 35 may be binary in this regard, although intermediate signal levels between low and high are also possible. The confidence level in the extracted information increases if more periods of the sensor signals 31 and 32 have been recorded and, for example, offset corrections or amplitude dependent thresholds have been applied in the signal processing. The confidence level may also increase with an increase number of signal crossings relative to the switching thresholds 15 and 16. This confidence is signaled by the confidence signal 35 to the sensor output control circuit 24.

After a reset of the confidence level signal 35 to a low in response to the reset signal, the signal tracking processing circuit 23 may switch the value of the confidence signal 35 to correspond to a high confidence level only after certain conditions are satisfied. For example, the signal tracking processing circuit 23 may monitor the speed signal 31 or the direction signal 32 for a full signal period (i.e., at least one signal period) after a reset of the thresholds 15 and 16, and switch the value of the confidence signal 35 to correspond to the high confidence level when at least one signal period is detected. The high confidence level indicates that an uncertainty over the vibration event has lapsed and that output pulses may resume with high confidence that they are correctly associated with a rotation of the target object.

In another example, an offset correction (i.e., threshold calibration) to thresholds 15 and 16 should occur after the reset to their minimum values. Once an offset correction has been performed for thresholds 15 and 16, the signal tracking processing circuit 23 monitors for an occurrence of a predetermined signal period or fraction thereof with respect to the speed signal 31 or the direction signal 32, and switch the value of the confidence signal 35 to correspond to the high confidence level when a predetermined signal period length has occurred and been detected.

For example, in the example shown in FIG. 3, one signal period of the speed sensor signal 31 is marked by two threshold crossings of signal 31 with respect to threshold 15. In another example shown in FIG. 5, one signal period of the speed sensor signal 31 is marked by three threshold crossings of signal 31 with respect to thresholds 15 and 16 (e.g., either two crossings of threshold 15 and one crossing of threshold 16, or two crossings of threshold 16 and one crossing of threshold 15). Of course, one signal period of the speed sensor signal 31 can be marked by five threshold crossings of signal 31 with respect to thresholds 15 and 16.

Thus, in order to switch the confidence signal 35 to correspond to a high confidence level, e.g., following a reset signal 42, two or more threshold crossings of 15 and/or 16 via signal 31 or 32 may be detected to indicate a predetermined signal period length used to trigger the high confidence level.

Following receipt of the suppression signal 41, the sensor output control circuit 24 is configured to reenable pulse generation at the output signal 34 only upon receiving the confidence signal 35 indicating the high confidence level.

Figure 4:
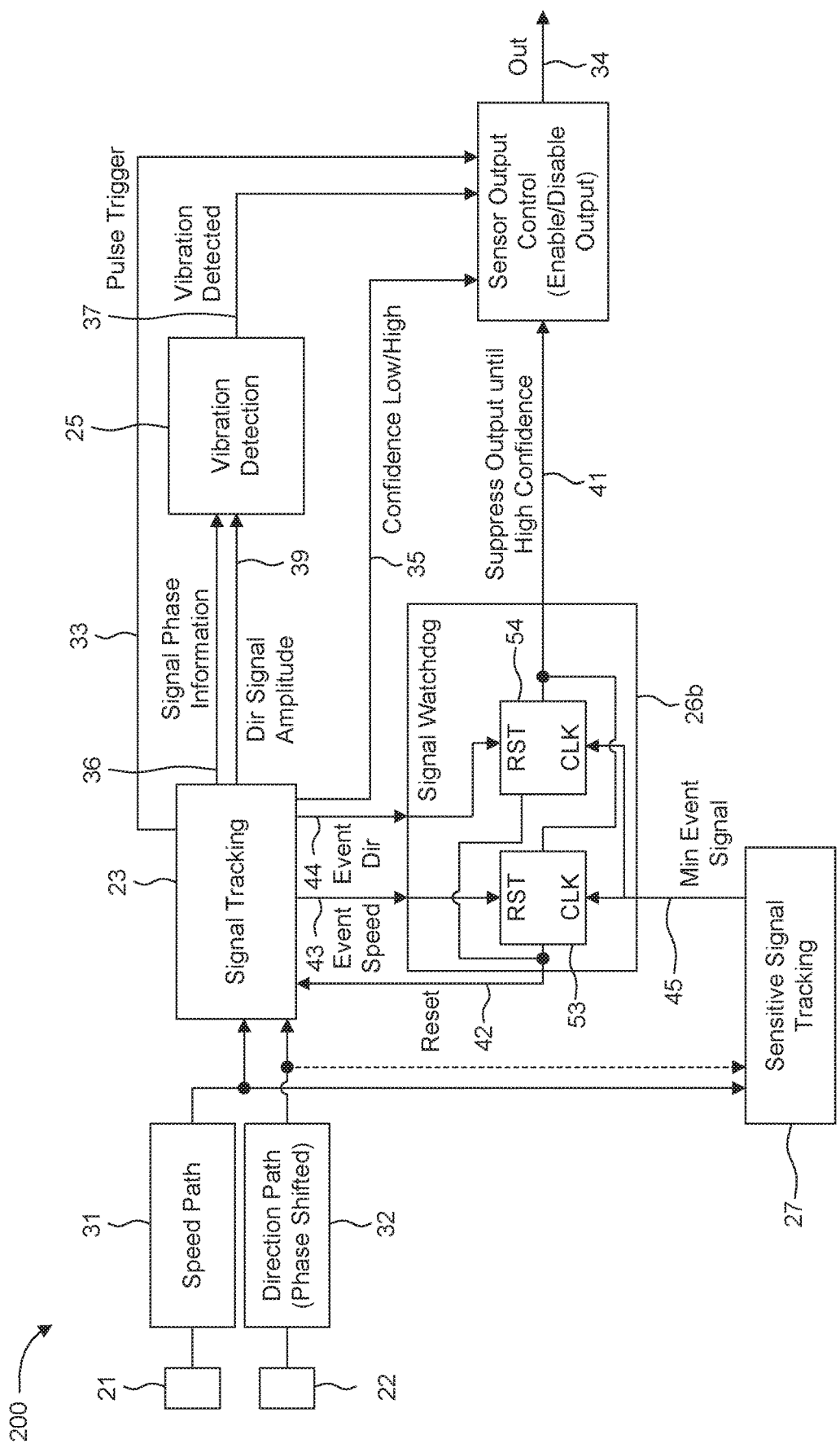
FIG. 4 is a schematic block diagram of another magnetic sensor according to one or more embodiments.

FIG. 4 is a schematic block diagram of a magnetic sensor 200 according to one or more embodiments. In particular, magnetic sensor 200 includes the signal watchdog circuit 26b that implements event detection for preventing sensor deadlock.

Figure 5:
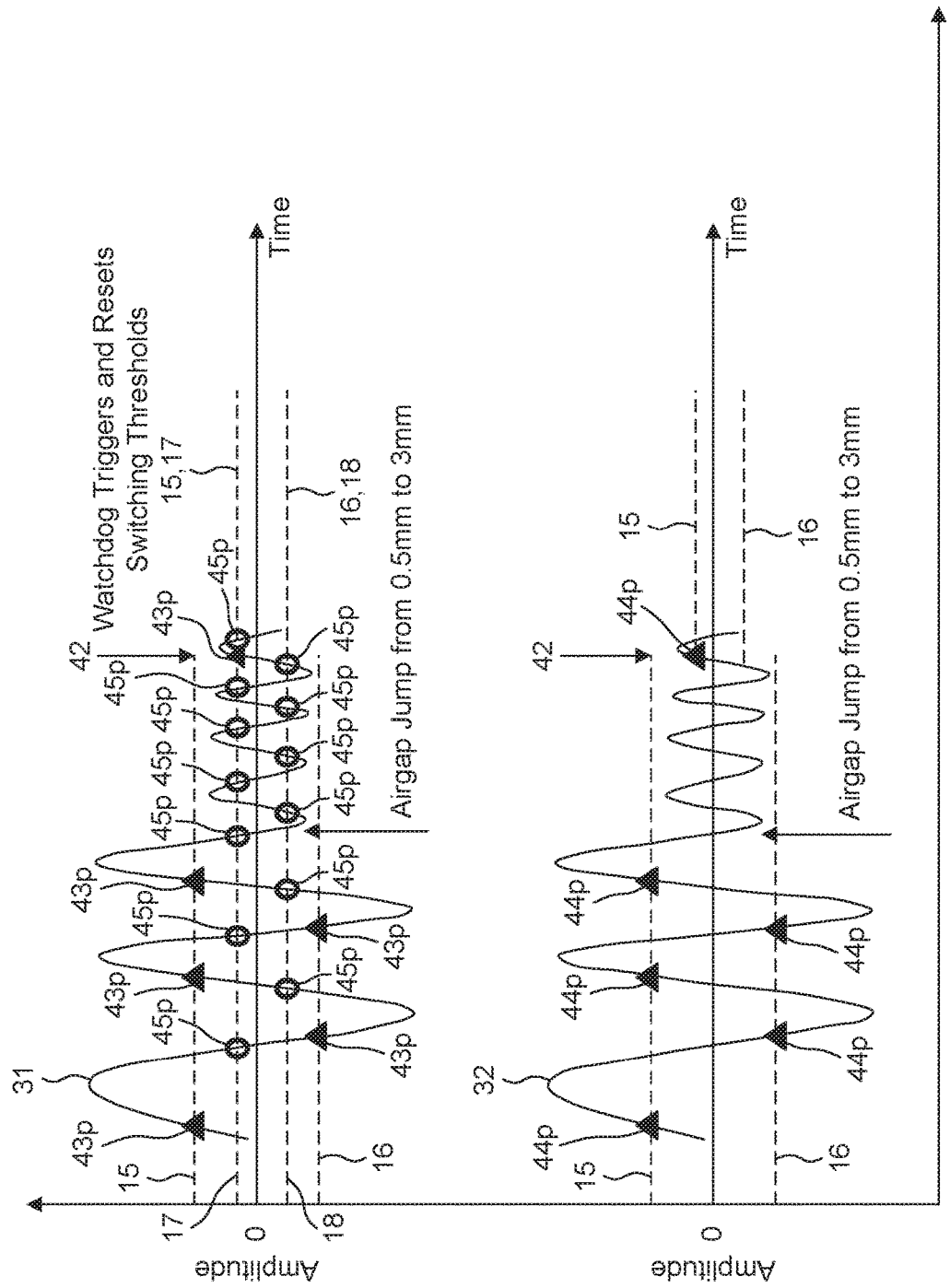
FIG. 5 illustrates an example of speed and direction sensor signals generated by two sensor elements along with two sets of hysteresis thresholds according to one or more embodiments.

FIG. 5 illustrates an example of speed and direction sensor signals generated by two sensor elements along with two sets of hysteresis thresholds according to one or more embodiments. The two sets of hysteresis thresholds are used by magnetic sensor 200 to prevent sensor deadlock. Thus, the signal diagrams shown in FIG. 5 should be read in view of the magnetic sensor 200 shown in FIG. 4.

It is further noted that the vibration detection based on signals 36 and 39 is performed as described above for magnetic sensor 100. Similarly, functions performed by the signal tracking processing circuit 23 in response to receiving reset signal 42 and functions performed by the sensor output control circuit 24 in response to receiving suppression signal 41 are performed as described above for magnetic sensor 100. In addition, event signals 43 and 44 now generated by the signal tracking processing circuit 23 are generated using a similar principle used for generating event signal 38 in the previous embodiment. Thus, functionality between sensors 100 and 200 should be assumed to be the same or similar unless otherwise specified.

To prevent sensor deadlock according to magnetic sensor 200, a second set of hysteresis thresholds is provided that includes a first minimum hysteresis threshold 17 and a second minimum hysteresis threshold 18. The magnitudes of thresholds 17 and 18 are equal to or less than the magnitudes of thresholds 15 and 16 and define a smaller threshold range than the threshold range of their larger counterparts. Thresholds 15-18 may be initialized at or reset to predefined minimum values (e.g., thresholds 15 and 17 are both equal to a first minimum value and thresholds 16 and 18 are both equal to a second minimum value) and subsequently thresholds 15 and 16 can be dynamically increased after one or more periods of the sensor signal 31 is analyzed for threshold calibration. As such, the thresholds 17 and 18 are located at or entirely within the limits of thresholds 15 and 16. Typically once a threshold calibration is performed that detects the speed sensor signal 31 above the predefined minimum value, thresholds 15 and 16 separate away from thresholds 17 and 18 such that thresholds 17 and 18 are located entirely within the limits of thresholds 15 and 16.

The minimum hysteresis thresholds 17 and 18 may be fixed or may be regularly adapted based on a predefined percentage (e.g., 33%) of the peak-to-peak average of the sensor signal 31 in a similar manner described in reference to adapting thresholds 15 and 16. The predefined percentage used for adapting thresholds 17 and 18 is significantly smaller than the predefined percentage used for adapting thresholds 15 and 16. Alternatively, minimum hysteresis thresholds 17 and 18 may be set to a predetermined factor smaller than the thresholds 15 and 16. Thus, as thresholds 15 and 16 change, thresholds 17 and 18 change based on the predetermined factor.

In addition to comparing the sensor signal 31 and the direction signal 32 to the switching thresholds 15 and 16, a sensitive signal tracking circuit 27 is configured to compare the sensor signal 31 to the minimum hysteresis thresholds 17 and 18 and generate a minimum event signal 45 that is generated using a similar principle used for generating event signal 38 in the previous embodiment.

As noted above, sudden airgap jumps may be caused, for example, by mechanical shock. The bigger the airgap between the magnetic sensor 100 and the target object, the smaller the sensor signals 31 and 32. Thus, when a large airgap jump occurs, sensor signals 31 and 32 no longer meet or cross the switching thresholds 15 and 16 and their extrema (maximum and minimum) are instead confined within the region there between. When this occurs, switching (i.e., pulse generation) at output signal 34 should not occur until it is confirmed that the vibration is no longer present.

However, to prevent a sensor deadlock, minimum hysteresis thresholds 17 and 18 are provided so that sensor signal 31, despite the increased airgap, can be monitored via the minimum hysteresis thresholds 17 and 18. In other words, despite the increased airgap, sensor signal 31 continues to cross the minimum hysteresis thresholds 17 and 18. Thus, the minimum hysteresis thresholds 17 and 18 should be set above the noise floor of the magnetic sensor 200 but low enough to enable monitoring of the sensor signal 31 by the sensitive signal tracking circuit 27 in the event of a large airgap increase.

As described above, the signal tracking processing circuit 23 implements an event generation protocol based on adaptive hysteresis thresholds 15 and 16. In this embodiment, the signal tracking processing circuit 23 uses both sensor signals 31 and 32 to generate speed signal events 43 (e.g., speed event pulses) and direction signal events 44 (e.g., direction event pulses), respectively. Each respective event pulse 43 and 44 is generated by either detecting a signal crossing one or both switching thresholds 15 or 16 or detecting instances when the sensor signal 31 and 32 is at a maximum or minimum peak amplitude. In other words, like event signal 38, event pulses for event signal 43 are generated by a trigger criteria based on sensor signal 31 and event pulses for event signal 44 are generated by a trigger criteria based on sensor signal 32. The same or different trigger criteria may be used for generating event pulses for event signal 43 and for event signal 44.

Event trigger points 43p and 44p are indicated in FIG. 5 and may be set according to any type of rule set. For example, speed signal events 43 (i.e., pulses) are generated by the signal tracking circuit 23 when the speed signal 31 crosses hysteresis threshold 15 (traveling upwards or on a rising direction) and/or crosses hysteresis threshold 16 (traveling downwards or on a falling direction). Direction signal events 44 (i.e., pulses) are generated by the signal tracking circuit 23 when the direction signal 32 crosses hysteresis threshold 15 (traveling upwards or on a rising direction) and/or crosses hysteresis threshold 16 (traveling downwards or on a falling direction). If the sensor signal 31 and the direction signal 32 are tracked correctly, in every signal period, at least one speed signal event 43 and at least one direction signal event 44 is signaled by the signal tracking processing circuit 23 to the signal watchdog circuit 26b.

The sensitive signal tracking circuit 27 implements an event generation protocol based on minimum hysteresis thresholds 17 and 18. In this embodiment, the sensitive signal tracking circuit 27 uses sensor signal 31 to generate minimum signal events 45 (e.g., minimum event pulses) by detecting signal crossings of sensor signal 31 across one or both minimum hysteresis thresholds 17 and 18. For example, minimum signal events 45 (i.e., pulses) are generated by the sensitive signal tracking circuit 27 when the speed signal 31 crosses hysteresis threshold 17 (traveling downwards or on a falling direction) and/or crosses hysteresis threshold 18 (traveling upwards or on a rising direction). Example event trigger points 45p are indicated in FIG. 5. The minimum event pulses are provided to the signal watchdog circuit 26b by way of the minimum event signal 45 and used as a clock signal for watchdog counters 53 and 54 for counting up a respective counter value.

In particular, the counter value of counter 53 is increased for each minimum event pulse received by minimum event signal 45 and compared with a predetermined counter threshold (e.g., 10). In addition, the speed event signal 43 is provided to a reset (RST) input of counter 53 and each event pulse from the speed event signal 43 triggers a reset of the counter value of counter 53 to zero. Thus, if the counter value of counter 53 reaches the predetermined counter threshold due to the absence of such an event pulse from event signal 43 (e.g., caused by a vibration event), the counter 53 triggers one or more set signals. In particular, the counter 53 generates a suppression signal 41 and a reset signal 42 corresponding to the set signal in response to the counter value of the counter 53 meeting or exceeding the predetermined counter threshold that corresponds to a preset signal timeout.

Similarly, the counter value of counter 54 is increased for each minimum event pulse received by minimum event signal 45 and compared with a predetermined counter threshold (e.g., 10). In addition, the direction event signal 44 is provided to a reset (RST) input of counter 54 and each event pulse from the direction event signal 44 triggers a reset of the counter value of counter 54 to zero. Thus, if the counter value of counter 54 reaches the predetermined counter threshold due to the absence of such an event pulse from event signal 55 (e.g., caused by a vibration event), the counter 54 triggers one or more set signals. In particular, the counter 54 generates a suppression signal 41 and a reset signal 42 corresponding to the set signal in response to the counter value of the counter 54 meeting or exceeding the predetermined counter threshold that corresponds to a preset signal timeout period.

Thus, the suppression signal 41 and the reset signal 42 can be triggered by either of the counters 53 and 54. In this way, the signal watchdog circuit 26b must regularly receive event pulses from both event signals 43 and 44 (i.e., within the preset signal timeout period) to be assured that a sensor deadlock has not occurred. If either of the counters 53 and 54 times out, then the signal watchdog circuit 26b determines that a potential sensor deadlock has occurred and generates the suppression signal 41 and the reset signal 42 to resolve a sensor deadlock.

The suppression signal 41 instructs the sensor output control circuit 24 to suppress output pulses of the output signal 34 until the confidence signal 35 indicates a high level of confidence after a recalibration phase (i.e., until confidence signal 35 is set to a value corresponding to high confidence).

The reset signal 42 resets the thresholds 15 and 16 at the signal tracking processing circuit 23 to predefined minimum values (e.g., threshold 15 is set to a first minimum value and threshold 16 is set to a second minimum value) so that threshold calibration of the thresholds 15 and 16 starts anew. For example, threshold 15 may be reset to coincide with threshold 17 and threshold 16 may be reset to coincide with threshold 18. Thresholds 17 and 18 may already be fixed at their respective minimum threshold values or may also be reset to minimum threshold values if they were adjusted during operation via autocalibration. The reset signal 42 also resets the confidence signal 35 to a low confidence value (i.e., a value corresponding to low confidence).

Figure 6A:
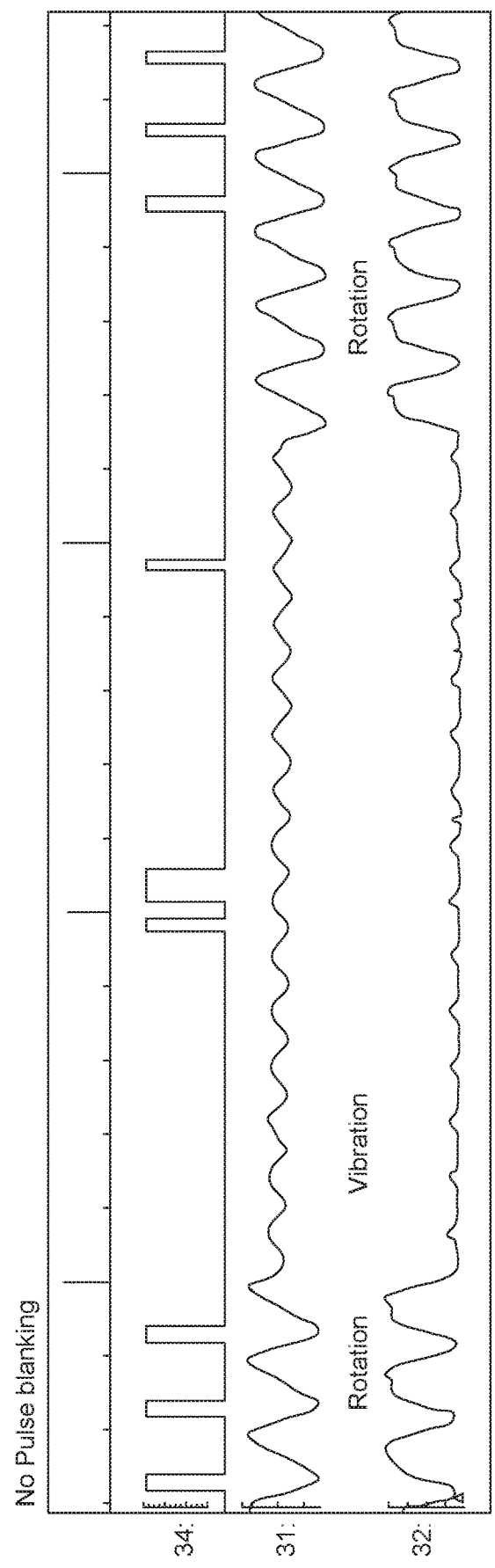
FIG. 6A illustrates a signal diagram according to a conventional speed magnetic sensor with no pulse blanking.

FIG. 6A illustrates a signal diagram according to a conventional speed magnetic sensor with a signal watchdog and no pulse blanking. In particular, the signal diagram includes the speed sensor signal 31, the direction sensor signal 32, and the output signal 34. As can be seen, pulses are still output at the output signal 34 during a vibration event that occurs between two intervals of rotation of the target object. Therefore, incorrect pulses are transmitted at the output that lead to incorrect information being interpreted by a microcontroller, ECU, or the like.

Figure 6B:
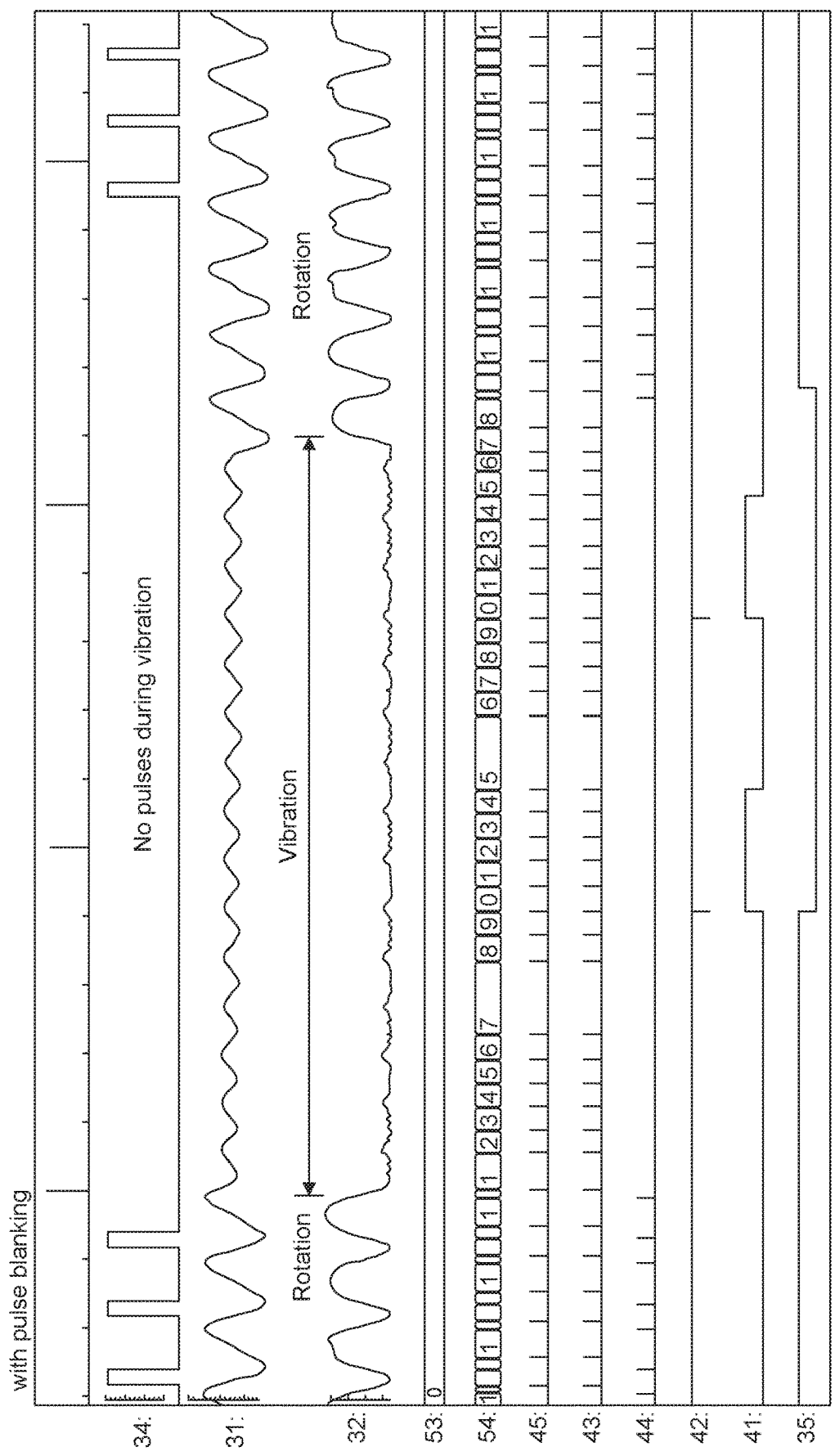
FIG. 6B illustrates a signal diagram according to one or more embodiments using pulse blanking.

FIG. 6B illustrates a signal diagram according to one or more embodiments using pulse blanking. In particular, the signals and counter values shown in the signal diagram correspond to those signals generated in magnetic sensor 200. As can be seen, output pulses at output signal 34 are completely suppressed during the vibration event and resume after the vibration detection history has passed. By looking at the internal signals during the vibration (45,44, 42), the detection of a watchdog event is still visible (e.g., when counter 54 reaches 10) but no wrong output pulses are sent because the confidence signal 35 is low.

While various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A sensor device, comprising:
    at least one first sensor element configured to generate a first sensor signal based on sensing a varying magnetic field;
    at least one second sensor element configured to generate a second sensor signal based on sensing the varying magnetic field;
    a signal tracking circuit configured to generate a trigger signal having trigger pulses that are generated based on first crossings of the first sensor signal with at least one of at least one adaptive threshold, wherein the signal tracking circuit further extracts vibration relevant information using the first sensor signal and the second sensor signal;
    an output controller configured to generate an output signal having output pulses that are triggered by the trigger pulses during a non-vibration event and further configured to suppress the output pulses during an entire duration of a vibration event;
    a vibration detection circuit configured to receive the extracted vibration relevant information, detect the vibration event based on the received extracted vibration relevant information, and indicate the detected vibration event to the output controller,
        wherein the signal tracking circuit is configured to generate a first event signal having first event pulses that are generated based on second crossings of the first sensor signal with at least one of the at least one adaptive threshold; and
    a watchdog circuit configured to monitor the first event pulses of the first event signal, detect an absence of the first event pulses, and transmit a suppression signal to the output controller in response to detecting the absence of the first event pulses,
    wherein the output controller is configured to suppress the output pulses in response to receiving the suppression signal until a confidence signal indicating a high confidence is received from the signal tracking circuit indicating that an uncertainty over the vibration event has lapsed.

2. The sensor device of claim 1, wherein the signal tracking circuit is configured to adjust the at least one adaptive threshold based on an amplitude of the first sensor signal and an update threshold algorithm.

3. The sensor device of claim 2, wherein each of the at least one adaptive threshold is an adaptive hysteresis threshold.

4. The sensor device of claim 1, wherein the signal tracking circuit is configured to generate the confidence signal indicating the high confidence when the signal tracking circuit detects at least one signal period of the first sensor signal following a triggering of the suppression signal.

5. The sensor device of claim 1, wherein:
    the watchdog circuit is configured to transmit a reset signal to the signal tracking circuit in response to detecting the absence of the first event pulses, and
    the signal tracking circuit is configured to reset each of the at least one adaptive threshold to a corresponding minimum threshold value in response to the reset signal.

6. The sensor device of claim 5, wherein, subsequent to a reset of each of the at least one adaptive threshold, the signal tracking circuit is configured to perform a calibration of the at least one adaptive threshold by adjusting the at least one adaptive threshold based on an amplitude of the first sensor signal and an update threshold algorithm such that each of the at least one adaptive threshold separates away from the corresponding minimum threshold value.

7. The sensor device of claim 6, wherein the signal tracking circuit is configured to generate the confidence signal indicating the high confidence when the signal tracking circuit detects at least one signal period of the first sensor signal following the calibration of the at least one adaptive threshold.

8. The sensor device of claim 1, wherein:
    the watchdog circuit is configured to transmit a reset signal to the signal tracking circuit in response to detecting the absence of the first event pulses, and wherein the signal tracking circuit is configured to reset the confidence signal to indicate a low confidence in response to the reset signal.

9. The sensor device of claim 1, wherein:
the watchdog circuit is a time watchdog circuit comprising a counter and a comparator that compares a counter value of the counter to a predetermined timeout threshold,
the counter is configured to increase the counter value according to a clock signal and reset the counter value at each of the first event pulses, and
the watchdog circuit is configured to generate the suppression signal in response to the counter value being equal to the predetermined timeout threshold.

10. The sensor device of claim 9, wherein:
the watchdog circuit is configured to transmit a reset signal to the signal tracking circuit in response to the counter value being equal to the predetermined timeout threshold, and
the signal tracking circuit is configured to reset each of the at least one adaptive threshold to a corresponding minimum threshold value in response to the reset signal.

11. The sensor device of claim 10, wherein the signal tracking circuit is configured to reset the confidence signal to indicate a low confidence in response to the reset signal.

12. The sensor device of claim 1, further comprising:
a sensitive signal tracking circuit configured to generate a minimum event signal having minimum event pulses that are generated based on crossings of the first sensor signal with at least one of at least one minimum threshold,
wherein the signal tracking circuit is configured to generate a second event signal having second event pulses that are generated based on crossings of the second sensor signal with at least one of the at least one adaptive threshold,
wherein the watchdog circuit is a signal watchdog circuit comprising a first counter and a second counter,
wherein the first counter is configured to increment a first counter value according to the minimum event pulses, reset the first counter value at each of the first event pulses, and compare the first counter value to a first predetermined counter threshold,
wherein the second counter is configured to increment a second counter value according to the minimum event pulses, reset the second counter value at each of the second event pulses, and compare the second counter value to a second predetermined counter threshold, and
wherein the watchdog circuit is configured to generate the suppression signal in response to either of the first counter value being equal to the first predetermined counter threshold or the second counter value being equal to the second predetermined counter threshold.

13. The sensor device of claim 12, wherein:
the watchdog circuit is configured to transmit a reset signal to the signal tracking circuit in in response to either of the first counter value being equal to the first predetermined counter threshold or the second counter value being equal to the second predetermined counter threshold, and
the signal tracking circuit is configured to reset each of the at least one adaptive threshold to a corresponding minimum threshold value in response to the reset signal.

14. The sensor device of claim 13, wherein the signal tracking circuit is configured to reset the confidence signal to indicate a low confidence in response to the reset signal.

15. The sensor device of claim 14, wherein the signal tracking circuit is configured to generate the confidence signal indicating the high confidence when the signal tracking circuit detects at least one signal period of the first sensor signal following a triggering of the reset signal.

16. The sensor device of claim 1, wherein:
the extracted vibration relevant information includes at least one of phase information and amplitude signal information, wherein the phase information corresponds to a phase shift between the first sensor signal and the second sensor signal, and wherein the amplitude signal information corresponds to amplitude values of the second sensor signal, and
the vibration detection circuit is configured to receive the at least one of phase information and amplitude signal information and detect the vibration event based on the received at least one of phase information and amplitude signal information.

17. An output pulse suppression method implemented in a speed sensor, the method comprising:
generating a first sensor signal based on sensing a varying magnetic field by at least one first sensor element;
generating a second sensor signal based on sensing the varying magnetic field by at least one second sensor element;
generating, by a sensor circuit, a trigger signal having trigger pulses that are generated based on first crossings of the first sensor signal with at least one of at least one adaptive threshold;
extracting, by the sensor circuit, vibration relevant information using the first sensor signal and the second sensor signal;
generating, by the sensor circuit, an output signal having output pulses that are triggered by the trigger pulses during a non-vibration event;
detecting, by the sensor circuit, a vibration event based on the extracted vibration relevant information;
suppressing, by the sensor circuit, the output pulses during an entire duration of the vibration event;
generating, by the sensor circuit, a first event signal having first event pulses that are generated based on second crossings of the first sensor signal with at least one of the at least one adaptive threshold;
monitoring, by the sensor circuit, the first event pulses of the first event signal;
detecting, by the sensor circuit, an absence of the first event pulses; and
suppressing, by the sensor circuit, the output pulses in response to detecting the absence of the first event pulses, including suppressing the output pulses until the vibration event has lapsed with high confidence indicated by a confidence signal.

18. The output pulse suppression method of claim 17, further comprising:
generating, by the sensor circuit, the confidence signal indicating the high confidence when at least one signal period of the first sensor signal is detected following a triggering of a suppression of the output pulses.

19. The output pulse suppression method of claim 17, further comprising:
generating, by the sensor circuit, a reset signal in response to detecting the absence of the first event pulses; and resetting, by the sensor circuit, each of the at least one adaptive threshold to a corresponding minimum threshold value in response to the reset signal.

20. The output pulse suppression method of claim 19, further comprising:
adjusting, by the sensor circuit, the at least one adaptive threshold based on an amplitude of the first sensor signal and an update threshold algorithm such that each of the at least one adaptive threshold separates away from the corresponding minimum threshold value.

21. The output pulse suppression method of claim 17, further comprising:
generating, by the sensor circuit, a reset signal in response to detecting the absence of the first event pulses; and
resetting, by the sensor circuit, the confidence signal to indicate a low confidence in response to the reset signal.

22. A sensor device, comprising:
at least one first sensor element configured to generate a first sensor signal based on sensing a varying magnetic field;
at least one second sensor element configured to generate a second sensor signal based on sensing the varying magnetic field;
a signal tracking circuit configured to generate a trigger signal having trigger pulses that are generated based on first crossings of the first sensor signal with at least one first threshold, wherein the signal tracking circuit further extracts vibration relevant information using the first sensor signal and the second sensor signal, and wherein the signal tracking circuit is further configured to generate a first event signal having first event pulses that are generated based on second crossings of the first sensor signal with at least one second threshold;
an output controller configured to generate an output signal having output pulses that are triggered by the trigger pulses during a non-vibration event and further configured to suppress the output pulses during a vibration event;
a vibration detection circuit configured to receive the extracted vibration relevant information, detect the vibration event based on the received extracted vibration relevant information, and indicate the detected vibration event to the output controller; and
a watchdog circuit configured to monitor the first event pulses of the first event signal, detect an absence of the first event pulses, and transmit a suppression signal to the output controller in response to detecting the absence of the first event pulses.

23. The sensor device of claim 22, wherein the output controller is configured to suppress the output pulses, in response to receiving the suppression signal, until the vibration event has lapsed.

* * * * *